(12) United States Patent
Elsayed et al.

(10) Patent No.: US 8,508,290 B2
(45) Date of Patent: Aug. 13, 2013

(54) INTERFACE FOR MEMS INERTIAL SENSORS

(76) Inventors: Ayman Elsayed, Cairo (EG); Ahmed Elmallah, Cairo (EG); Ahmed Elshennawy, Cairo (EG); Ahmed Shaban, Cairo (EG); Botros George, Cairo (EG); Mostafa Elmala, Cairo (EG); Ayman Ismail, Cairo (EG); Mostafa Sakr, Cairo (EG); Ahmed Mokhtar, Cairo (EG)

( * ) Notice: Subject to any disclaimer, the term of this patent is extended or adjusted under 35 U.S.C. 154(b) by 118 days.

(21) Appl. No.: 13/231,731

(22) Filed: Sep. 13, 2011

(65) Prior Publication Data

US 2012/0235726 A1 Sep. 20, 2012

Related U.S. Application Data

(60) Provisional application No. 61/382,898, filed on Sep. 14, 2010.

(51) Int. Cl.
*H03B 1/00* (2006.01)
*H03K 5/00* (2006.01)
*H04B 1/10* (2006.01)

(52) U.S. Cl.
USPC ............... 327/553; 327/552; 327/554; 330/9; 73/504.12

(58) Field of Classification Search
USPC ...... 73/504.12; 310/12.03; 330/9; 327/552, 327/553
See application file for complete search history.

(56) References Cited

U.S. PATENT DOCUMENTS

| | | | |
|---|---|---|---|
| 7,454,967 B2 * | 11/2008 | Skurnik | 73/146.5 |
| 2010/0263445 A1 * | 10/2010 | Hayner et al. | 73/504.12 |
| 2012/0013351 A1 * | 1/2012 | Daniel et al. | 324/602 |

* cited by examiner

*Primary Examiner* — John Poos

(57) ABSTRACT

In a high-performance interface circuit for micro-electromechanical (MEMS) inertial sensors, an excitation signal (used to detect capacitance variation) is used to control the value of an actuation signal bit stream to allow the dynamic range of both actuation and detection paths to be maximized and to prevent folding of high frequency components of the actuation bit stream due to mixing with the excitation signal. In another aspect, the effects of coupling between actuation signals and detection signals may be overcome by performing a disable/reset of at least one of and preferably both of the detection circuitry and the MEMS detection electrodes during actuation signal transitions. In a still further aspect, to get a demodulated signal to have a low DC component, fine phase adjustment may be achieved by configuring filters within the sense and drive paths to have slightly different center frequencies and hence slightly different delays.

27 Claims, 11 Drawing Sheets

INTERFACE FOR MEMS INERTIAL SENSORS

RELATED APPLICATIONS

This application claims benefit of U.S. Application 61/382,898 titled SELF-CLOCKED ASIC INTERFACE FOR MEMS INERTIAL SENSORS filed 14 Sep. 2010, incorporated herein by reference.

BACKGROUND OF THE INVENTION

Numerous applications of micro-electromechanical (MEMS) inertial sensors require a high-performance ASIC interface. Existing interface techniques are not fully satisfactory in various respects.

For example, in feedback (e.g., force-feedback) systems where a drive loop is present, an excitation signal is needed for detection of capacitance variations in both a sense loop and a drive loop. The excitation signal should not affect the actuation applied, for example, to a proof mass (or proof masses) of the MEMS sensor. However, since the excitation signal is applied to the proof mass, and since actuation capacitors share the same proof mass with the detection capacitors, therefore the excitation signal affects the actuation signal content and dynamic range.

Another issue relates to undesired coupling that can occur between the actuation stream of one channel and detection paths of the same channel, or even different channels (e.g., sense mode to sense mode coupling or sense mode to drive mode coupling, etc.). Such coupling can distort the signal and result in severe degradation in the performance of the detection front-end circuits. This effect is exaggerated in sense mode, as the combined effect of parasitic capacitance and process mismatch is on the order of the detection capacitance variation.

Several solutions have been proposed to solve this coupling issue. Some solutions depend on frequency separation between actuation and detection (which works only in the case of coupling between different channels); other solutions depend on estimating the coupling transfer function and compensating this effect in later stages (in digital domain signal processing or—at the cost of increased complexity—in the analog domain). Other proposals have included decreasing the actuation signal level (at the expense of reduced actuation dynamic range), or manual trimming to compensate for the mismatches.

In feedback (e.g., force-feedback) systems where a drive loop is present, a sense signal may contain a desired sensor input signal AM-modulated at the frequency of a drive signal. Hence, to demodulate the bit stream to get the original signal, the drive and the sense signals are multiplied using a multiplier to obtain a demodulated output signal. To get the demodulated signal to have the lowest possible DC component, accurate phase adjustment between SNS and DRV bit streams may be required. Various approaches to achieving this phase adjustment typically entail power and/or area penalties.

Hence, an improved interface for interfacing to MEMS inertial sensors is desired.

BRIEF DESCRIPTION OF THE DRAWING FIGURES

The present invention may be further understood from the following Detailed Description in conjunction with the appended drawing figures. In the drawing.

DETAILED DESCRIPTION

Summary

This patent disclosure describes an ASIC or other circuit to interface with MEMS inertial sensors such as vibratory MEMS gyroscopes and accelerometers, including in closed loop configurations. Closed loop configuration provides best performance in harsh environments. Techniques to improve the sensor interface performance are described, including techniques that allow for extending dynamic range of the MEMS actuation and detection signals, canceling coupling between electrodes in the MEMS module, and achieving fine phase tuning between sense and drive loops for improved demodulation.

Description

Figure 1:
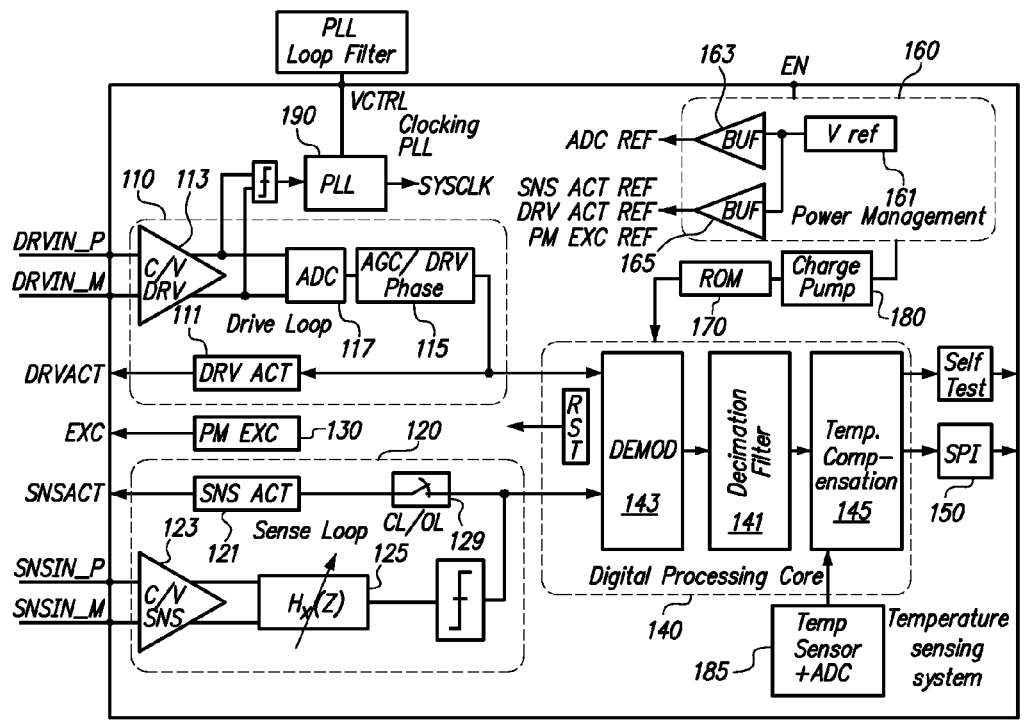
FIG. 1 is an architecture block diagram of a circuit (e.g., an ASIC) in which the present interface techniques may be used.

The system architecture of an exemplary ASIC is shown in FIG. 1. Functionally, this system can be divided into main blocks as follows:

1—MEMS Sensor Interface Circuitry (110, 120, 130):

This part of the circuit provides actuation voltages for sense and drive electrodes of the MEMS sensor, through sense actuation (SNS ACT) switches 121 and drive actuation (DRV ACT) switches 111, respectively. Moreover block 130 (PM EXC) provides a proof mass excitation voltage required by capacitance sensing circuits in both the drive and sense loops. Finally, a sense capacitance-to-voltage converter 123 (C/V SNS) and a drive capacitance-to-voltage converter 113 (C/V DRV) perform capacitance-to-voltage sensing in the corresponding loops.

Figure 2A:
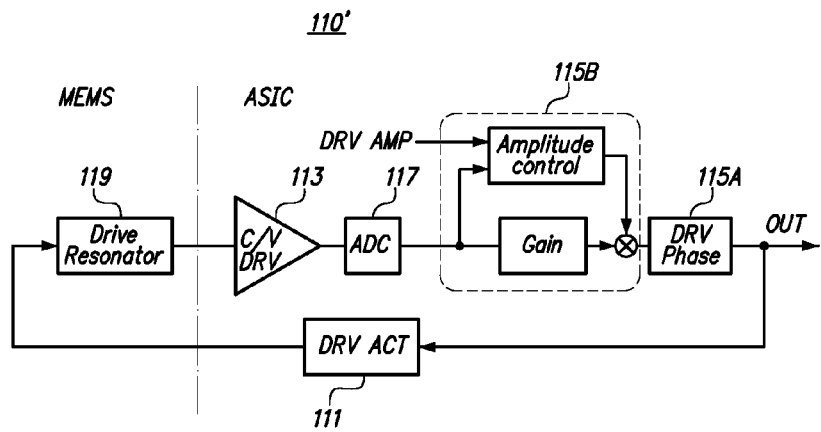
FIG. 2A is a diagram of a drive loop of the ASIC of FIG. 1.

2—MEMS Sensor Drive (DRY) Loop 110:

Referring to FIG. 2A, the drive loop 110 incorporates a phase shift 115A (DRY Phase) required to achieve an oscillation condition of a drive resonator 119 (including a mechanical element, e.g., a suspended mass) of the MEMS sensor, as well as automatic gain control 115B (AGC) to control the amplitude of oscillation of the mechanical element. In the illustrated embodiment, an ADC 117 (which may be implemented, for example, as a band pass sigma delta modulator) converts the drive loop C/V output from circuit 113 into a single bit reading of the MEMS sensor drive oscillation signal.

Figure 2B:
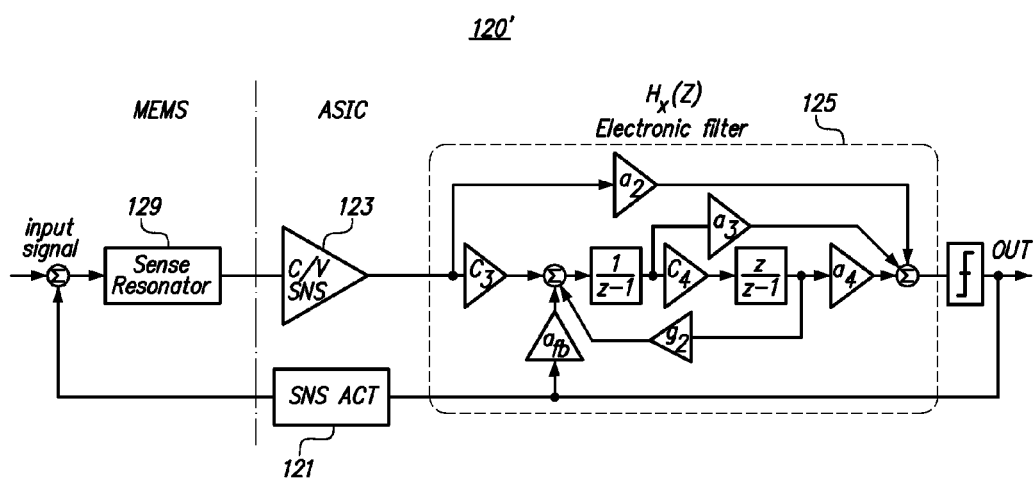
FIG. 2B is a diagram of a sense loop of the ASIC of FIG. 1.

3—MEMS Sensor Sense (SNS) Loop 120:

Referring to FIG. 2B, in the illustrated embodiment, the MEMS sensor includes a sense resonator 129 (including a mechanical element, e.g., a suspended mass). The sense resonator 129 is acted upon by an input signal to be sensed (for example, motion) and a feedback signal output of the sense actuation switches 121. As described more fully hereinafter, in the illustrated embodiment, an excitation signal EXC output by block 130 (FIG. 1) is applied to both the drive resonator 119 and the sense resonator 129.

The sense loop 120 performs feedback (e.g., force-feedback) motion control of a mechanical element of the sense resonator 129, and provides a digital output reading. This is achieved by implementing closed-loop feedback (e.g., force-feedback) using an electro-mechanical sigma delta modulator 120' for the sense mode. The ASIC can also be configured to operate in open loop mode. In this case, the sense loop is opened (switch 129, FIG. 1) and the electronic filter $H_x(z)$ coefficients are altered, such that the electronic filter 125 operates as a sigma-delta ADC.

4—The Digital Processing Core (140, FIG. 1):

The digital processing core 140 decimates and filters (141) the output of the sigma delta modulators of both the drive and sense loops (110, 120), and performs a final sense signal demodulation operation (143). In addition, the digital processing core 140 performs temperature compensation (145) of the MEMS sensor reading, and controls an SPI interface 150. In one aspect, the digital processing core 140 functions as an electrostatic actuation controller. Additionally, the digital processing core 140 may output a reset signal, disable signal, or power down signal used to reduce undesired coupling of actuation signals as described below.

5—Power Management (160, FIG. 1):

This block provides all required biasing currents and supply voltages to different circuit blocks. Moreover, it generates required high-voltage actuation reference signals. In the illustrated embodiment, a band gap reference voltage Vref (161) is generated and buffered (163, 165) for the ADCs (117, 125) and for MEMS sensor excitation and actuation (111, 121, 130). The power management block 160 is also responsible for generating necessary voltages for operation of a ROM 170. In the illustrated embodiment, a charge pump 180 is used for this purpose.

6—The Temperature Sensing System (185, FIG. 1):

This block senses the die temperature and converts it into a digital reading.

7—Clocking PLL (190, FIG. 1)

The PLL generates the master clock of the system.

ASIC Self-Clocking

In one embodiment, an ASIC self-clocking technique is used. This technique simplifies interfacing of the ASIC to different MEMS sensor modules.

Feedback (e.g., force-feedback) operation reduces system sensitivity to MEMS sensor process variations, increases bandwidth, and allows operation in matched mode. Therefore, a closed loop configuration can achieve best performance in harsh environments. Incorporating the MEMS sensor as one part of the feedback (e.g., force-feedback) loop filter converts the system into a hybrid electromechanical $\Sigma\Delta$ modulator with a continuous-time (CT) part represented by the mechanical filter and a discrete-time (DT) part represented by the electronic filter. The CT nature of the mechanical filter makes the performance of the $\Sigma\Delta$ modulator sensitive to the exact feedback pulse shape. For this reason, a low-jitter clock is required for best performance using force feedback.

The ASIC of FIG. 1 uses a PLL 190 to generate the system clock. The high Q resonance of the MEMS sensor oscillation (of the drive resonator 119, for example) may be used to generate a clean reference clock for the ASIC PLL 190, resulting in a low noise floor at the ASIC output. Hence, the ASIC PLL 190 does not need an external crystal as a reference clock, and the ASIC becomes self-clocked. Using a MEMS sensor based reference clock allows fixing the ratio between the system sampling frequency and the mechanical drive resonance frequency (e.g., Coriolis signal carrier). Therefore, this arrangement enables interfacing to a wide-range of MEMS sensor modules. More particularly, the self-clocking technique in the ASIC allows the drive loop 110, sense loop 120 and DSP blocks 140 to track the frequency of the MEMS sensor. Hence, the ASIC can interface to a wide range of MEMS sensor frequencies.

The drive loop of FIG. 2A, described above, works in conjunction with the PLL 190 to enable self-clocking. Since the ASIC is self-clocked, the ADC sampling frequency is locked to the MEMS sensor resonance frequency through the PLL 190, which controls the sampling frequency of the ADC 117.

Low jitter self-clocking of the ASIC may be taken advantage of by the MEMS sensor sense loop. In the illustrated embodiment, the MEMS sensor sense loop of FIG. 2B, described above, is implemented based on continuous-time $\Delta\Sigma$ modulation, because the low-jitter clocking of the self-clocked ASIC achieves better SNR for CT feedback (e.g., force-feedback) operation. As an example, the illustrated sense loop is achieved by implementing a 4th order electro-mechanical $\Delta\Sigma$ modulator using a switch-cap electronic filter 125. The modulator architecture may be based on a feed-forward topology with a feed-back branch to stabilize the loop. The noise floor appearing at the output is minimized, as a result of the low-jitter clocking effect on continuous-time $\Delta\Sigma$ operation being minimized. Moreover, the ASIC can interface to a range of MEMS sensor modules by using a programmable divider in the PLL 190.

The digital processing core 140 of FIG. 1, described above, filters the output of the $\Delta\Sigma$ modulators of both the drive and sense loops (110, 120), and performs the final output demodulation using the demodulator 143. The demodulation output is decimated using a programmable decimation filter 141. Two band pass filters (1405, FIG. 14), centered at the MEMS sensor resonance frequency, filter out noise of both the drive and sense loops, before multiplying them for demodulation, to avoid mixing and down conversion of quantization noise in the band of interest. The poles and zeros of each band pass filter (1405) scale with the sampling frequency (depending on the MEMS sensor module), and therefore the center frequency will be correctly tuned with variations of the MEMS sensor resonance frequency.

Actuation Technique with Improved Dynamic Range

In the illustrated embodiment, the excitation signal EXC (FIG. 1) is applied to both the drive resonator 119 and the sense resonator 129 and is needed for the detection of capacitance variations in both the sense and drive loops (120, 110). This excitation signal should not reduce the effectiveness of the actuation signals (SNSACT, DRYACT).

Figure 3:
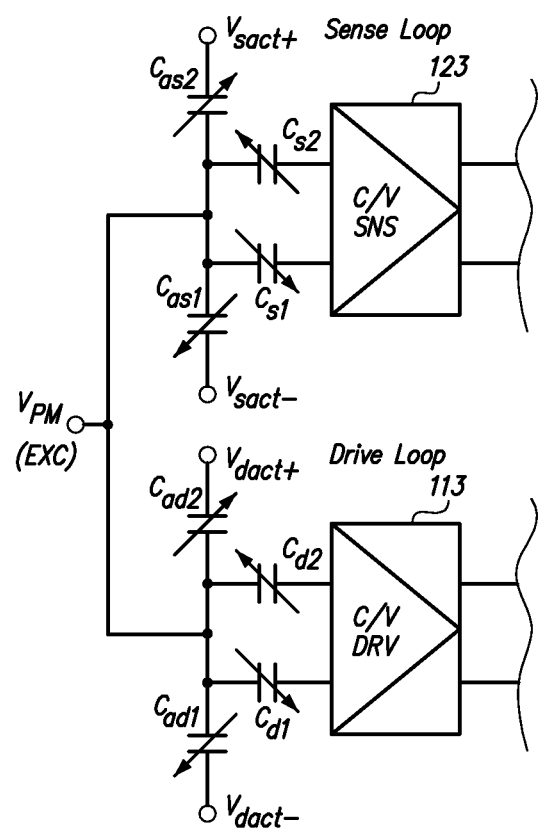
FIG. 3 is diagram of a MEMS electrical model together with detection circuits of sense loop and drive loop.

FIG. 3 illustrates, for example, the case of a fully differential MEMS sensor showing an arrangement of the electrodes. In the sense loop, variable capacitances associated with a sense resonator (129, FIG. 2B) are arranged in a "N" configuration. First and second actuation capacitors Ca1 and Ca2 are arranged in the arms of the Pi; sense capacitors Cs1 and Cs2 are arranged in the legs of the Pi and are coupled to inputs of the sense C/V converter 123. The excitation signal EXC (also referred to as a proof mass voltage $V_{PM}$) is applied between the arms of the Pi. A similar configuration applies to the drive resonator and the drive loop.

Since the excitation signal EXC is added on proof masses of the respective resonators, and since the actuation capacitors (Ca) share the same proof mass with the detection capacitors (Cs), therefore the excitation signal affects the actuation signal content and dynamic range.

In the following electrostatic actuation technique, the excitation signal (used to detect capacitance variations) is used to control the value of the actuation signal bit stream to allow the dynamic range of both actuation and detection paths to be maximized and to prevent folding of high frequency components of the actuation bit stream due to mixing with the excitation signal.

In the illustrated embodiment, the electrostatic actuation force generated in response to an excitation signal can be calculated according to the following equation, wherein the excitation signal EXC is represented as Vpm:

$$F_{act} \alpha ((V_{act+} - V_{pm})^2 - (V_{act-} - V_{pm})^2) \quad (1)$$

$$F_{act} \alpha (V_{act+}^1 - V_{act-}^2 - 2*V_{pm}(V_{act+} - V_{act-})) \quad (2)$$

Figure 4:
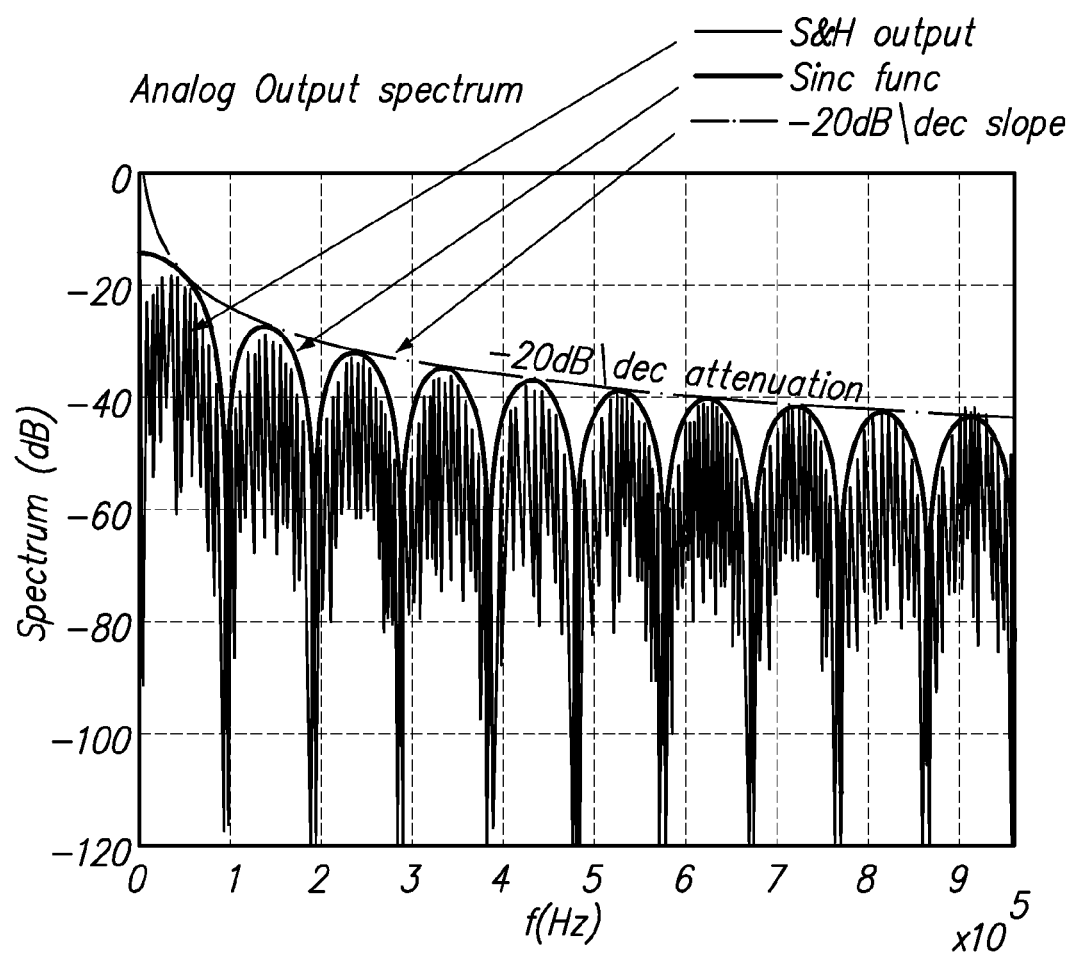
FIG. 4 is a signal plot of a sample actuation spectrum showing high frequency components.

Note that the third term in the (2) will cause both degradation in actuation dynamic range and folding of high order components of the actuation signal due to mixing with the excitation signal. FIG. 4 shows an example of the resulting high order components of a sample actuation stream.

Figure 5:
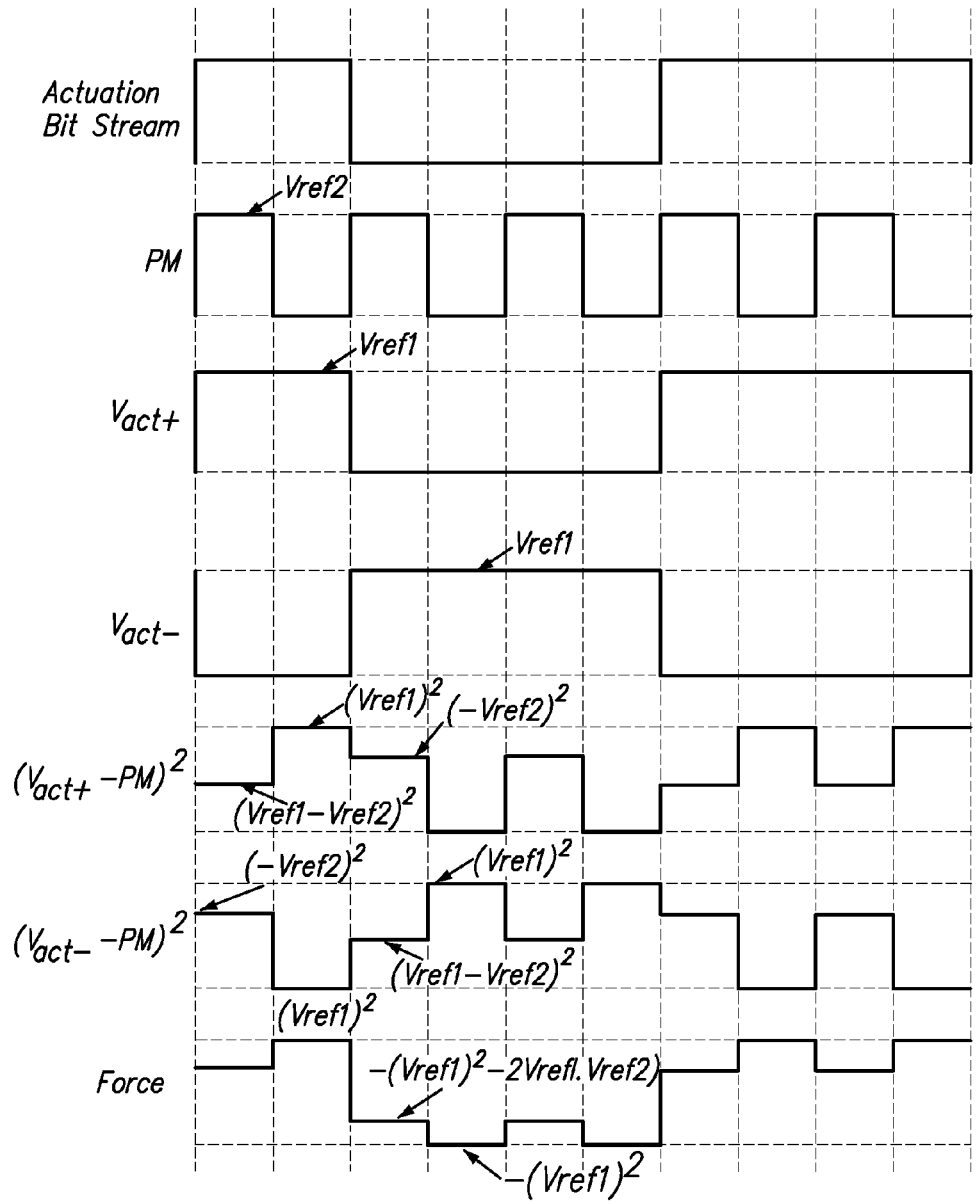
FIG. 5 is a waveform diagram illustrating actuation and detection waveforms and the consequent effective actuation force.

Past systems have usually been designed to compromise between the PM signal level ($V_{pm}$) and the actuation voltage level, which will either decrease the detection dynamic range if the $V_{pm}$ value is reduced or the actuation dynamic range if the $V_{pm}$ value is increased. FIG. 5 shows the waveforms of one actuation and detection scheme. In this example the actuation signal is assumed to have a voltage level ($V_{ref1}$), while the excitation signal is assumed to have a voltage level ($V_{ref2}$). If $V_{ref1} = V_{ref2}$, then the effective actuation force dynamic range is equal to zero (positive and negative streams have the same waveform).

Assuming that $V_{ref1} = V_{ref}$ and $V_{ref2} = V_{ref}/2$ as a compromise between actuation and detection dynamic ranges, a degradation of 6 dB is introduced to both the actuation and the detection dynamic ranges.

Figure 6:
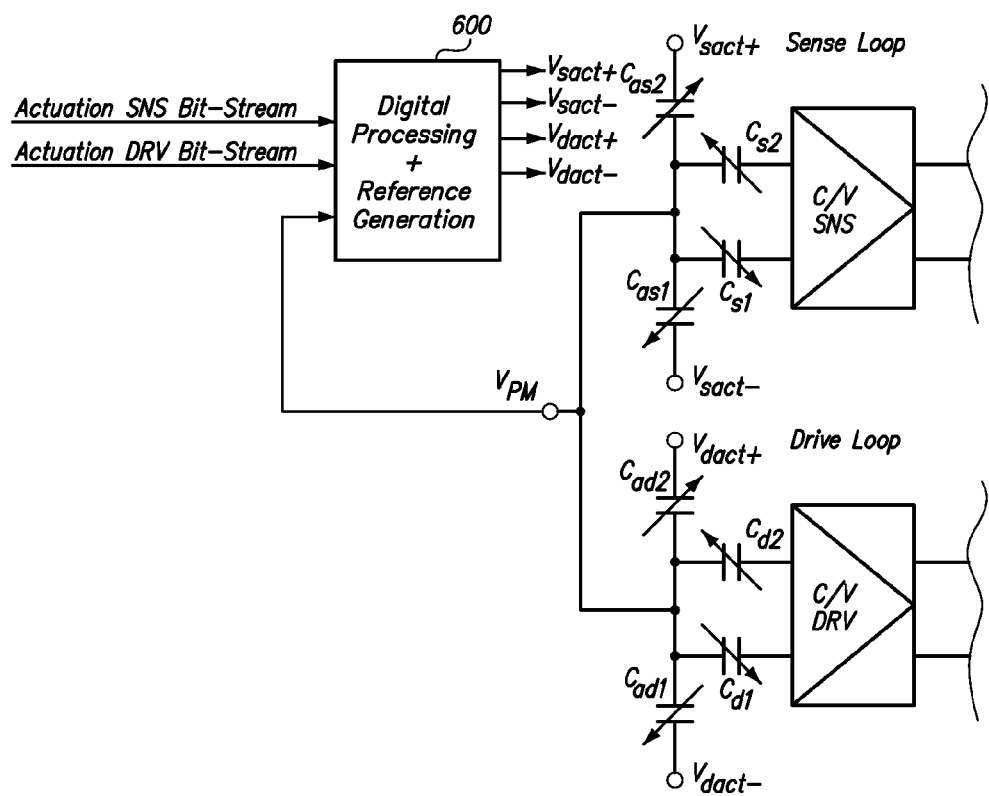
FIG. 6 is diagram of a MEMS electrical model illustrating a modified actuation technique in which the excitation signal controls the shape of the actuation signal.

To avoid such an impairment of dynamic range, the value of the actuation signal may be controlled according to the current value of the PM signal as shown in FIG. 6. A block 600 performs digital processing and reference generation and may correspond to blocks 140 and 160 of FIG. 1. The block 600 receives sense and drive bit streams (SNS, DRV). The block also uses the excitation signal $V_{PM}$ as an input signal to condition the actuation signals. In response to the sense and drive bit streams, and taking into account the excitation signal $V_{PM}$, the block 600 outputs actuation signals, for example actuation signals Vsact+/Vsact− and Vdact+/Vdact. The notation Vact+, Vact− is used to refer generally to these four actuation signals.

Figure 7:
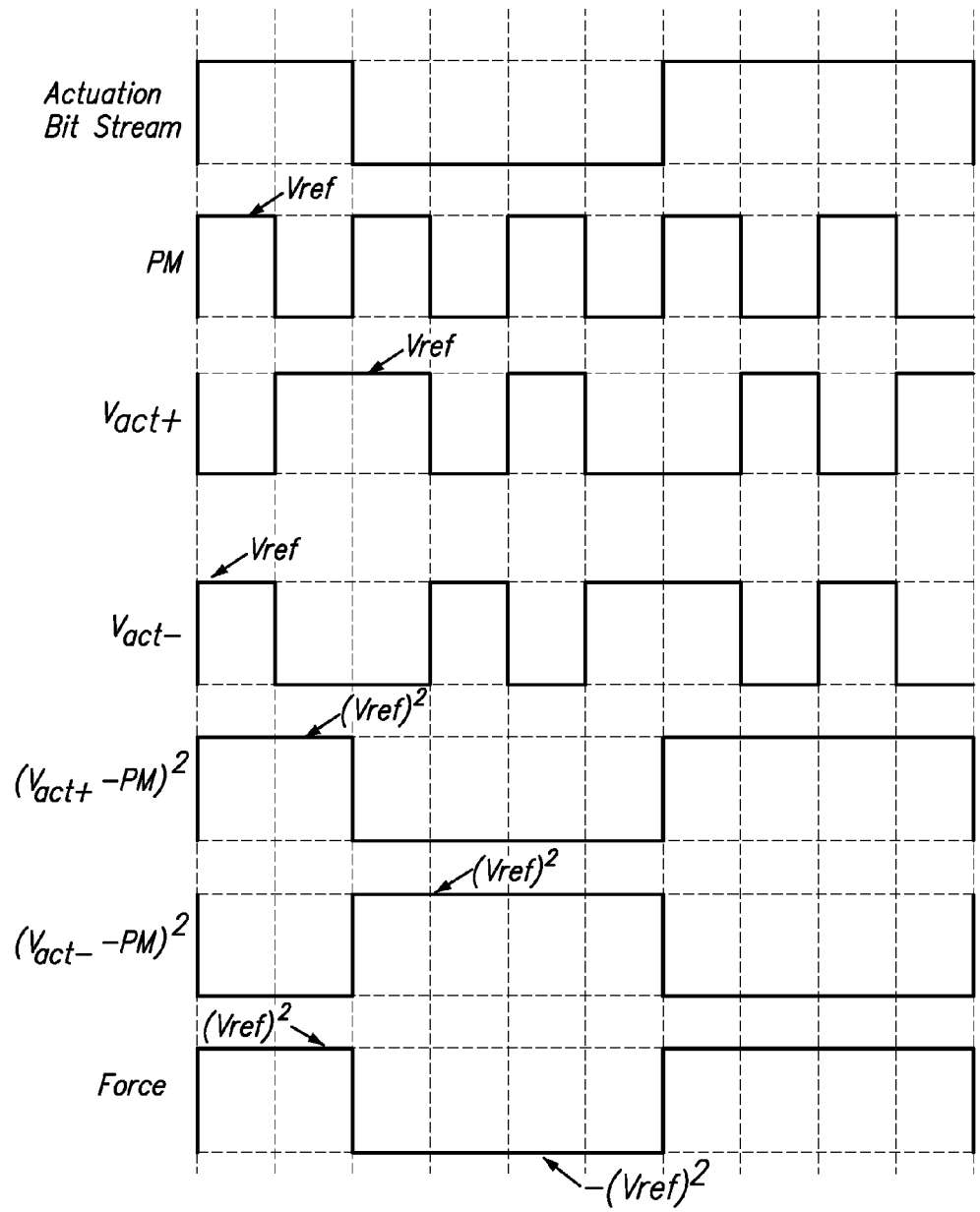
FIG. 7 is a waveform diagram illustrating modified actuation and detection waveforms and the consequent effective actuation force in accordance with an embodiment of FIG. 6.

For a square wave excitation signal, the actuation signal bit stream may be logically combined (e.g., XQRed or XNORed) with the PM signal. FIG. 7 shows the waveforms of the actuation signals (Vact+, Vact−), excitation signals and the resulting electrostatic force components (first and second terms in equation (1) above). In FIG. 7, actuation bit stream is XORed with a signal PM ($V_{pm}$) to produce Vact+, while the actuation bit stream is XNORed with the PM signal to produce Vact−. From FIG. 7, it may be seen that no folding of high frequency components occurs (i.e., actuation signal content is preserved intact), and that both the actuation force and excitation signal are represented by the full dynamic range of the reference voltage.

Figure 8:
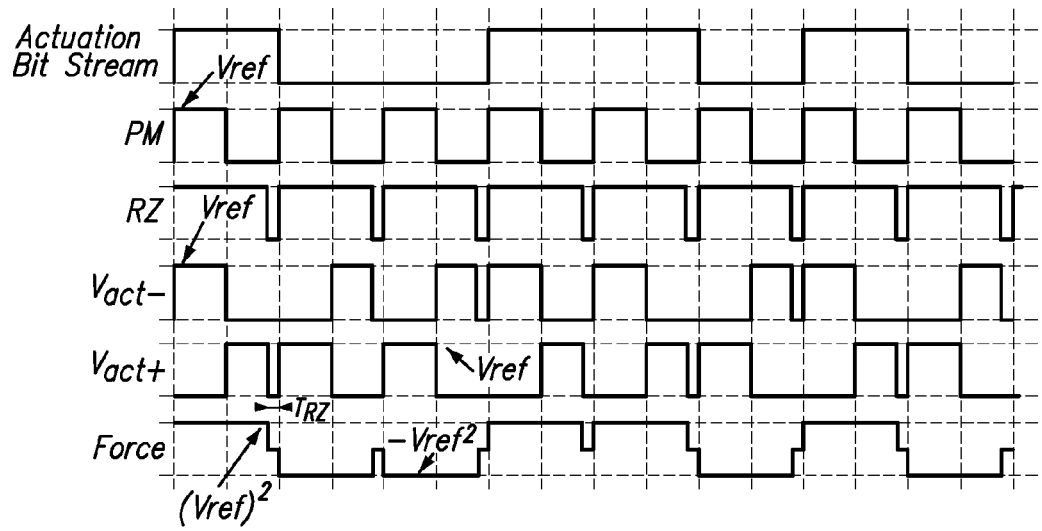
FIG. 8 is a waveform diagram like that of FIG. 7 showing waveforms in accordance with a RZ (return-to-zero) option.

FIG. 8 shows the actuation and detection waveforms with an added Return-to-Zero (RZ) option, which may be used in continuous time actuation for enhancing the linearity of the DAC. The block 600, in one aspect, may be considered as circuitry (or means) for applying a return-to-zero encoding to an actuation signal.

By controlling the actuation stream according to the value of the excitation signal, the following advantages may be achieved:

Allows AC square wave excitation
Makes the excitation transparent to the actuation
Eliminates signal Folding
Maximizes the available actuation dynamic range
Maximizes the available detection dynamic range
Allows smaller supply voltages
Actuation Signal Coupling Cancellation In feedback (e.g., force-feedback) systems, an actuation stream is applied on the actuation electrodes to produce a certain movement on the proof mass. (This feedback can be in a positive feedback loop or a negative feedback loop). Ideally, the actuation voltage will affect the mechanical element according to a response characteristic of the mechanical element.

Figure 9:
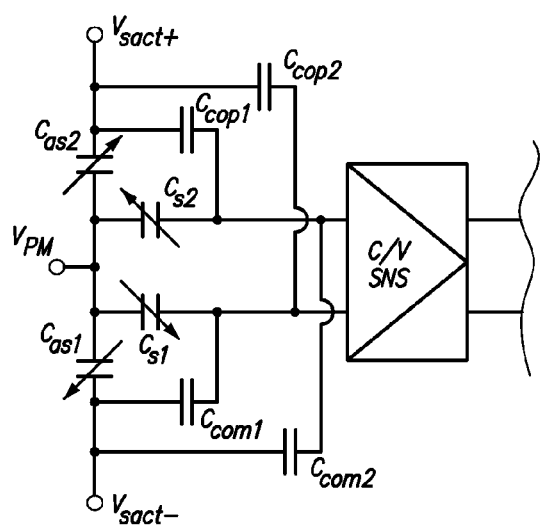
FIG. 9 is a diagram illustrating unintended coupling from an actuation path to a detection path.

Due to process mismatch and parasitic capacitance, the actuation bit stream can couple directly to the detection circuit as shown in FIG. 9. Unintended coupling paths Ccop1 and Ccop2 couple from the Vact+ signal to the Cs1 and Cs2 signals, respectively. Similarly, unintended coupling paths Ccom1 and Ccom2 couple from the Vact− signal to the Cs1 and Cs2 signals, respectively. This coupling can occur between the actuation stream of one channel and detection paths of the same channel, or even different channels (e.g., SNS mode to SNS mode coupling or SNS mode to DRV mode coupling).

Obviously, these coupling paths can distort the signal and results in severe degradation in the performance of the detection front-end circuits. This effect is exaggerated in SNS mode, as the parasitic capacitance/process mismatch is on the order of the detection capacitance variation (e.g., Cs1, Cs2 of FIG. 9).

Figure 10:
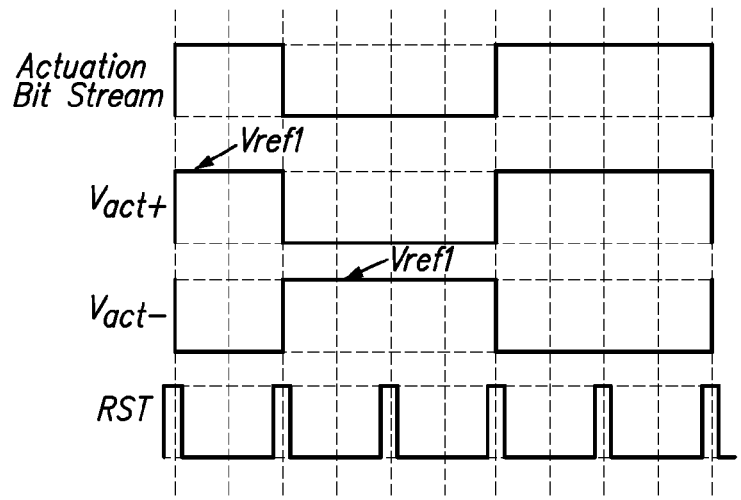
FIG. 10 is a waveform diagram showing actuation and excitation signals together with an added reset signal RST.
Figure 11:
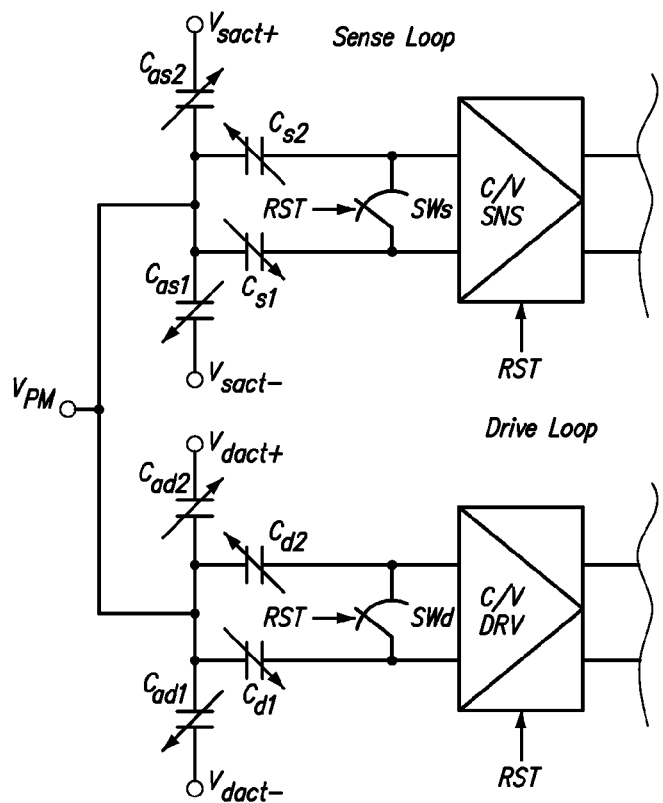
FIG. 11 is a diagram showing the reset signal RST applied to detection circuits C/V SNS and C/V DRV and to MEMS electrodes.

The effects of such coupling may be overcome by performing a disable/reset of at least one of and preferably both of the detection circuitry and the MEMS detection electrodes during actuation signal transitions as shown in FIG. 11, for example using a reset signal RST as shown in FIG. 10. More generally, a control signal may be used to reset, disable, or power down selected circuit elements. In the embodiment of FIG. 11, a reset signal RST is applied to the C/V SNS detection circuitry 123 and to the C/V DRV detection circuitry 113. In addition, analog switches SWs and SWd are provided between the sense electrodes of the MEMS sensor and the drive electrodes of the MEMS sensor. The reset signal RST is used to control the switches SWs and SWd, causing them to close when the reset signal is asserted. Resetting the detection circuitry (113, 123) and the MEMS electrodes cancels the effect of the parasitic coupling paths of the actuation signal.

Figure 12:
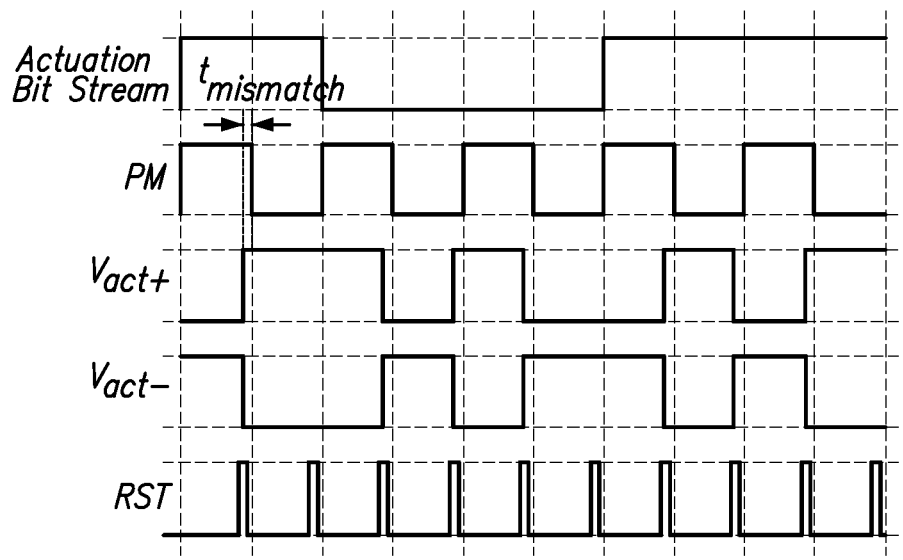
FIG. 12 is a waveform diagram illustrating the modified actuation and detection waveforms of FIG. 7 used in combination with the reset signal of FIG. 10.
Figure 13:
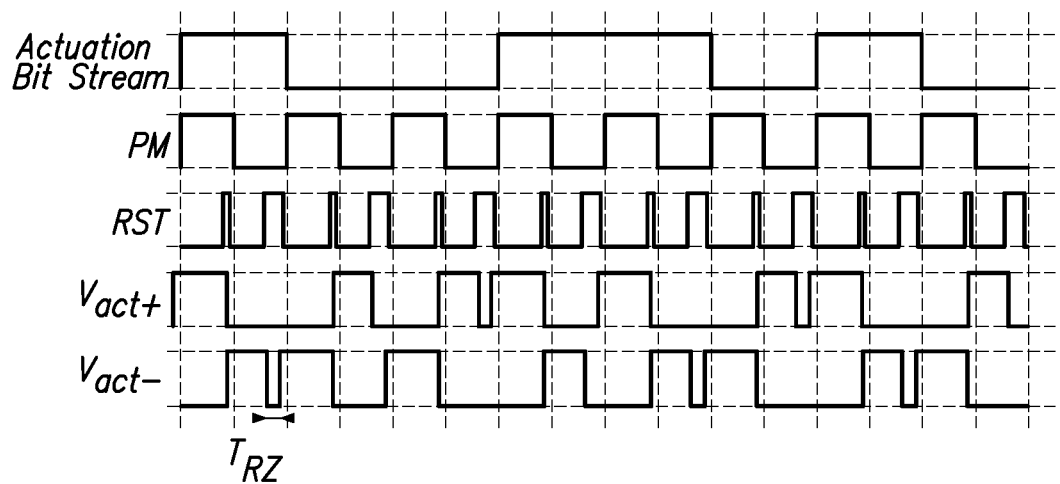
FIG. 13 is a waveform diagram like that of FIG. 12 showing waveforms in accordance with a RZ (return-to-zero) option.

To allow the detection of the excitation signal edges in the presence of the reset pulse RST, a time mismatch ($t_{mismatch}$ FIG. 12) between the excitation signal and the actuation signal edges may be introduced. Furthermore, the foregoing coupling cancellation technique may be used together with the dynamic range improvement technique described previously. The resulting waveforms are shown in FIG. 12. FIG. 13 shows a sample timing diagram where: 1) a mismatch in timing between the actuation and detection signals is added; 2) XOR actuation with RZ is applied as previously described; and 3) a reset/disable pulse RST for the detection electrodes and circuitry is added around the actuation signal edges for XOR actuation.

Using the foregoing technique to cancel the effect of the parasitic path between actuation and detection in feedback (e.g., force-feedback) systems, the following advantages may be achieved:

Allows ΣΔ actuation signal

Removes coupling between actuation signals and different detection channels

Maximizes the available actuation dynamic range

Avoids need to decrease actuation signal to decrease the coupled signal

Maximizes the available detection dynamic range

Allows detection dynamic range to be completely allocated for detection signal

Removes need for complex trimming

Removes the need for complex signal processing in analog or digital domains

Demodulation with Fine Phase Tuning Between Sense and Drive Loops

Figure 14:
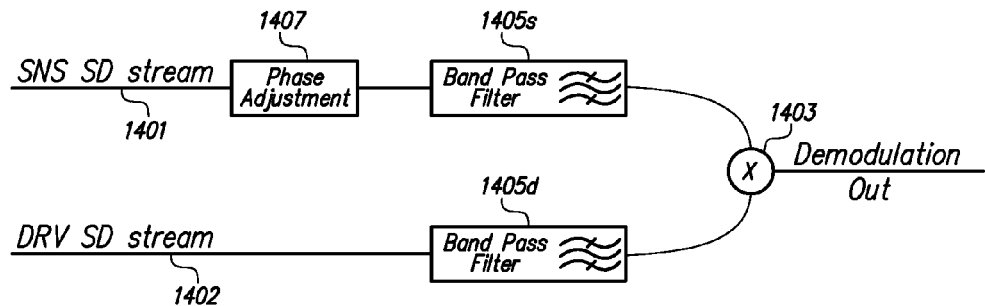
FIG. 14 is a block diagram of a demodulation portion of the circuit of FIG. 1.

Referring to FIG. 14 and FIG. 2B, the SNS sigma delta bit stream 1401 at the SNS loop output (out, FIG. 2B) contains the input signal (input signal, FIG. 2B) AM-modulated at the DRV signal frequency. Hence, to demodulate the bit stream to get the original signal, the DRY and the SNS signals (1401, 1402) are multiplied using a multiplier 1403 to obtain a signal Demodulation Out as shown in FIG. 14. Two band pass filters (BPF) 1405s and 1405d may be used to remove sigma delta noise before multiplication. To get the demodulated signal to have the lowest possible DC component, phase adjustment (1407, FIG. 14) between the SNS and DRV bit streams (1401, 1402) may be applied. This phase adjustment can be achieved by adding delay to either the SNS bit stream 1401 or the DRY bit stream 1402. In one embodiment, the phase adjustment 1407 may be implemented using a programmable shift register—i.e., the signal can be delayed by multiples of the operating clock periods. However, this technique can add only coarse phase shift if the system clock period is relatively large. For example, if the MEMS sensor resonance is at 3 kHz and the system clock frequency is 400 kHz, then the minimum phase shift that can be added using such a shift register is:

$$\text{Phase}_{minimum} = \frac{360}{400\ \text{kHz}/3\ \text{kHz}} = 2.7°$$

If the required phase shift is about 87°, then the shift register length should be greater than 32 bits. In order to get fine tuning in the phase adjustment, the clock frequency can be increased; however, this increases the power consumption of the system and the design complexity with respect to timing. Moreover, the area increases as a result of adding registers in the shift register to get the required phase shift. For example, if the required phase resolution is $$\frac{2.7°}{4},$$

then the clock frequency should increase 4 times. In addition, if the required phase shift is about 87°, then the shift register length should be greater than 128 bits, which is four times the length of the shift register in the previous case.

In order to obtain accurate phase alignment without incurring significant power or area penalty, the BPFs 1405 (that are already used to remove the SD noise) may be configured to achieve fine phase tuning by introducing a certain offset in center frequencies of the BPFs. The shift register 1407 may be kept for coarse tuning.

Figure 15:
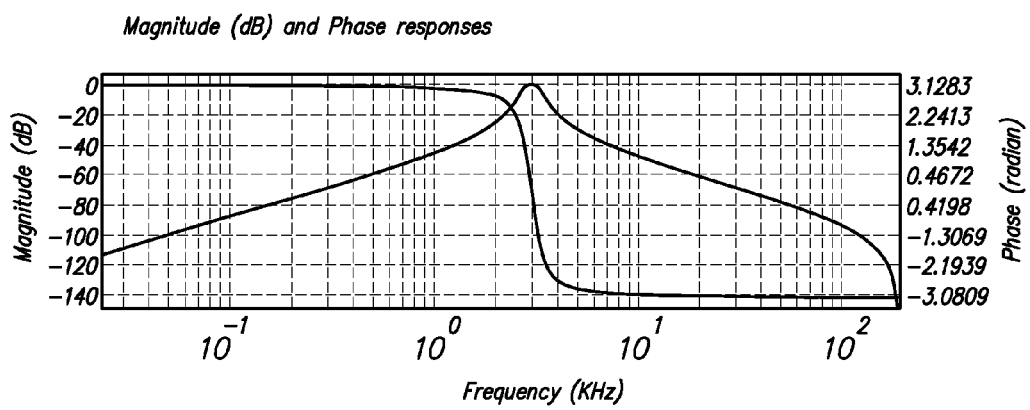
FIG. 15 is a plot showing magnitude and phase responses of the filters of FIG. 14.

As an example, the transfer function of filters that may be used in the ASIC of FIG. 1 is shown in FIG. 15. In the illustrated embodiment, both filters are identical with bandwidths of 200 Hz centered at the MEMS sensor resonance. Hence, the phase added by the respective filters to the SNS and the DRY signals is exactly the same phase. To add fine tuning in the phase adjustment, the center frequencies of the two filters can be made different from each other with a very small difference. As shown in FIG. 15 the phase response of the filter is very sharp at the center frequency. As a result, shifting the center of the drive (or sense) filter slightly can add the required phase shift. For example, changing the center frequency of one of the filters slightly might mean that one of them can be centered at 3 kHz, whereas the other is centered at 3.01 kHz. Therefore, the two filters coincide approximately with respect to magnitude, whereas the phase shifts of the two filters will be different so as to result in a net phase shift of the required value.

Figure 16:
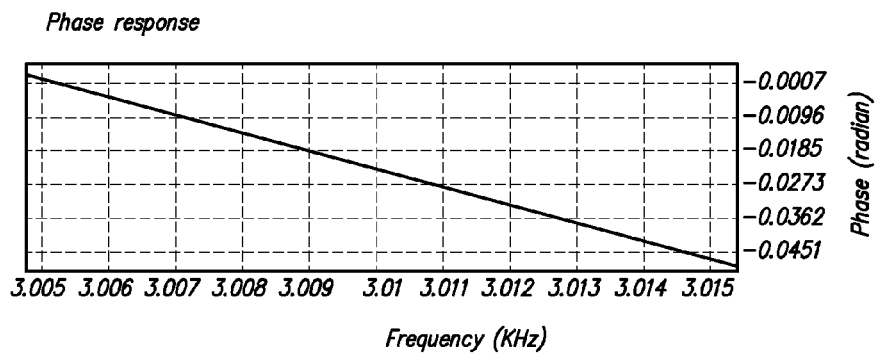
FIG. 16 is a plot of a phase shift as a function of filter center frequency for an offset one of the bandpass filters of FIG. 15.

As shown in FIG. 16, if the center frequencies of the filters differ by 10 Hz, then the phase shift between the two filters is about 0.04 rad (~2.7°). In the illustrated embodiment, 2.7° is the maximum phase shift required to be added by the filter, since phase shift in increments of 2.7° can be added directly by coarse tuning (using, for example, a shift register as described). As a rough estimate therefore, in the illustrated embodiment, the center frequencies of the two filters may differ by less than 10 Hz to get a fine phase shift less than 2.7°.

In some embodiments, the center frequencies may be fixed. In other embodiments, the center frequencies may be adjustable.

Using the foregoing technique to achieve fine phase adjustment between sense and drive paths in feedback (e.g., force-feedback) systems, the following advantages may be achieved:

Allows a demodulated output with a low DC component to be obtained

Avoids power and area penalties imposed by other approaches

It will be apparent to those of ordinary skill in the art that the present invention can be embodied in other specific forms without departing from the spirit or essential character thereof The foregoing description is therefore to be regarded as illustrative, not restrictive. The scope of the invention is defined by the appended claims, not the foregoing description, and all changes which some within the range of scope of equivalents thereof are intended to be embraced therein.

What is claimed is:

1. An integrated circuit for interfacing with a MEMS sensor, comprising:

an electrostatic actuation controller configured to generate an actuation signal and an excitation signal and to receive a sense information signal; and a sensing capacitance-to-voltage converter responsive to a signal from the MEMS sensor for producing a sense signal;

wherein the electrostatic actuation controller is configured to, during at least some signal transitions of the actuation signal, apply a control signal to the sensing capacitance-to-voltage converter to cause it to be reset, disabled or powered down.

2. The apparatus of claim 1, comprising:

a drive capacitance-to-voltage converter responsive to a signal from the MEMS sensor for producing a drive signal; and a demodulator coupled to the drive signal and the sense signal for demodulating sense information carried by the sense signal to produce the sense information signal.

3. The apparatus of claim 1, wherein the electrostatic actuation controller is configured for timing the excitation signal and the actuation signal such that transitions of the actuation signal occur slightly prior to transitions of the excitation signal by a time $t_{mismatch}$.

4. The apparatus of claim 1, wherein the electrostatic actuation controller is configured for timing the excitation signal and the control signal such that the excitation signal is caused to transition in response to a transition of the control signal to an inactive state.

5. A method of interfacing with a MEMS sensor comprising a suspended mass, the method comprising:

responsive to a sense signal output by the MEMS sensor, sensing capacitance variations caused by motion of the mass;

producing an actuation signal to be applied to the MEMS sensor for causing an influence to be exerted upon the mass, and an excitation signal to be applied to at least one sense capacitor of the MEMS sensor; and during at least some signal transitions of the actuation signal, resetting, disabling or powering down said sensing in response to a control signal.

6. The method of claim 5, comprising timing the excitation signal and the actuation signal such that transitions of the actuation signal occur slightly prior to transitions of the excitation signal by a time $t_{mismatch}$.

7. The method of claim 5, comprising timing the excitation signal and the control signal such that the excitation signal is caused to transition in response to a transition of the control signal to an inactive state.

8. The method of claim 5, comprising applying a logical operation to the excitation signal and a further signal to obtain the actuation signal.

9. The method of claim 8, wherein the logical operation is one of an XOR and an XNOR operation.

10. The method of claim 9, comprising applying a return-to-zero encoding to the actuation signal.

11. The method of claim 5, wherein sensing capacitance variations is performed using a capacitance-to-voltage converter, comprising resetting the capacitance-to-voltage converter in response to the control signal.

12. The method of claim 11, comprising setting the sense signal to known value in response to the control signal.

13. The method of claim 5, comprising setting the sense signal to known value in response to the control signal.

14. The method of claim 13, wherein said sensing capacitance variations is performed using a capacitance-to-voltage converter, comprising resetting the capacitance-to-voltage converter in response to the control signal.

15. The method of claim 13, wherein the sense signal is a differential signal comprising a positive signal and a negative signal, the method comprising setting the positive signal and the negative signal to be equal.

16. An integrated circuit for interfacing with a MEMS sensor comprising a suspended mass, the integrated circuit comprising:

sensing circuitry responsive to a sense signal output by the MEMS sensor for sensing capacitance variations caused by motion of the mass;

control circuitry for applying to the MEMS sensor an actuation signal to cause an influence to be exerted upon the mass, and an excitation signal to be applied to at least one sense capacitor of the MEMS sensor; and circuitry for, during at least some signal transitions of the actuation signal, applying a control signal to the sensing circuitry to reset, disable or power down said sensing circuitry.

17. The apparatus of claim 16, wherein the control circuitry is configured for timing the excitation signal and the actuation signal such that transitions of the actuation signal occur slightly prior to transitions of the excitation signal by a time $t_{mismatch}$.

18. The apparatus of claim 16, wherein the control circuitry and the reset circuit are configured for timing the excitation signal and the control signal such that the excitation signal is caused to transition in response to a transition of the control signal to an inactive state.

19. The apparatus of claim 16, comprising circuitry for applying a logical operation to the excitation signal and a further signal to obtain the actuation signal.

20. The apparatus of claim 19, wherein the logical operation is one of an XOR and an XNOR operation.

21. The apparatus of claim 20, comprising circuitry for applying a return-to-zero encoding to the actuation signal.

22. The apparatus of claim 16, wherein the sensing circuitry comprises a capacitance-to-voltage converter, wherein the capacitance-to-voltage converter is reset in response to the control signal.

23. The apparatus of claim 22, wherein the sensing circuitry comprises means for setting the sense signal to a known value in response to the control signal.

24. The apparatus of claim 16, wherein the sensing circuitry comprises means for setting the sense signal to a known value in response to the control signal.

25. The apparatus of claim 24, wherein said sensing circuitry comprises a capacitance-to-voltage converter, wherein the capacitance-to-voltage converter is reset in response to the control signal.

26. The apparatus of claim 24, wherein the sense signal is a differential signal comprising a positive signal and a negative signal, wherein said means for setting is configured to set the positive signal and the negative signal to be equal.

27. The apparatus of claim 26, wherein said means for setting comprises an analog switch.

* * * * *